United States Patent [19]

Fagerquist et al.

[11] Patent Number: 4,937,589

[45] Date of Patent: Jun. 26, 1990

[54] CONTINUOUS INK JET PRINT HEADS

[75] Inventors: Randy L. Fagerquist; Wendell L. Wood, both of Dayton, Ohio

[73] Assignee: Eastman Kodak Company, Rochester, N.Y.

[21] Appl. No.: 397,214

[22] Filed: Aug. 23, 1989

[51] Int. Cl.⁵ .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,623,897 | 11/1986 | Brown et al. | 346/75 |
| 4,646,104 | 2/1987 | Braun | 346/1.1 |
| 4,683,477 | 7/1987 | Braun et al. | 346/75 |
| 4,847,631 | 7/1989 | Naruse et al. | 346/75 |

*Primary Examiner*—Bruce A. Reynolds
*Assistant Examiner*—Gerald E. Preston
*Attorney, Agent, or Firm*—John D. Husser

[57] ABSTRACT

A miniature continuous ink jet print head assembly comprises coupled drop ejection and drop control units. The drop ejection unit includes an elongated stimulator body having a manifold recess in one end and an orifice plate affixed thereover. Piezoelectric actuator strips are mounted on opposing longitudinal side walls of the stimulator body. The drop control unit includes a catcher body and a charge plate mounted on the top surface of the catcher body. Dimensionally stable adhesive couples the drop control unit to the side walls of the stimulator body.

2 Claims, 3 Drawing Sheets

CONTINUOUS INK JET PRINT HEADS

FIELD OF INVENTION

The present invention relates to continuous ink jet print head constructions and, more particularly, to improved configurations that reduce the size of such print heads.

BACKGROUND ART

Print head assemblies of the kind employed in binary, continuous ink jet printing usually comprise, in one form or another, the following components: (1) an orifice plate having an array of orifices from which ink streams are ejected; (2) a manifold construction for supplying ink under pressure to those orifices; (3) resonator means for imparting vibrations to stimulate predetermined drop break-up of ejected ink streams; (4) a charge plate having a plurality of electrodes to selectively charge, or pass without charge, drops breaking up from the ink streams and (5) a catcher assembly to receive non-printing drops and return them to the ink circulation system for resupply to the orifice manifold.

These print heads are varied in size from full sheet-width arrays, to partial sheet-width arrays to a small size, adapted to be carried by a traversing print carriage to scan successive lines of a print sheet rotating on a print platen. For some printing applications, it would be desirable to have available even smaller print head assemblies. For example, in certain applications, such as multicolor printing, it would be easier to cooperatively position smaller print heads. The larger the print head size, the larger must be the carriage for mounting and moving it on a traversing printer, and the larger is the footprint of the print head in stationary or remote uses of the print head.

SUMMARY OF INVENTION

Thus, one significant purpose of the present invention is to provide improved structural configurations for reducing the size of binary-type, continuous ink jet print head assemblies, while maintaining good quality in their printed output. A related object is to provide size-reduced print head assemblies that operate with equal or improved reliability compared to larger versions. Such print head assemblies offer advantages in regard to the density in which they can be cooperatively used and, in regard to cost and mechanical path length complexity.

In one preferred embodiment, the present invention constitutes a miniature continuous ink jet print head assembly comprising joined drop ejection and drop control units. The drop ejection unit includes a stimulator body having a manifold recess in one end, and inlet and outlet passages communicating therewith, and an orifice plate affixed over the manifold recess. The stimulator body has longitudinal side walls normal to the orifice plate and a pair of elongated piezoelectric actuator strips respectively on an opposing pair of the side walls. The drop control unit includes a charge plate, having a plurality of charge electrodes and respective leads, mounted on the top of a catcher body, which has a drop discharge passage spaced from the mounted charge plate by a drop impact surface. The units are joined as an integral unit, e.g. mechanically or with dimensionally stable adhesive means, so that the charge electrodes are in predetermined spacial alignment with the orifices.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
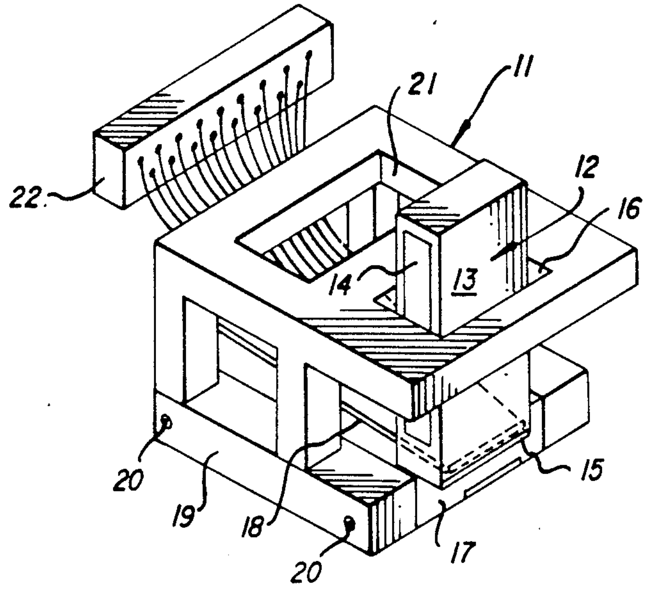
FIG. 1 PRIOR ART
FIG. 1 is a perspective view illustrating a small print head assembly in accord with one prior art approach.

The prior art print head assembly 10 shown in FIG. 1 comprises several subassemblies mounted on a machined metal frame 11. Specifically, a droplet ejection subassembly 12, including a resonator block 13, piezoelectric actuator strips 14 and an orifice plate 15 is mounted, e.g. as described in U.S. Pat. No. 4,683,477, by ink supply and return tubes in a front frame portion 16. A drop catcher component 17 has a charge plate 18 attached to its top surface, and these combined components are adjustably mounted in a lower platform 19 of the frame 11 by four screws 20. Positioning of the catcher/charge plate unit, relative to the resonator, is performed during assembly with the ink jets running, to assure proper alignment of the charge plate electrodes vis a vis the jet break-off location. The frame 11 also is constructed to mount a final ink filter (not shown) in opening 21 and a connector board(s) 22 on its back side. It will be appreciated that the size of the assembly 10 is considerably larger than the critical print head portions, i.e. the resonator, orifice plate, charge electrodes and catcher impact and discharge surfaces. Also, this construction presents a large mechanical path length through the frame structure to couple the orifice plate and charging electrodes.

Figure 3:
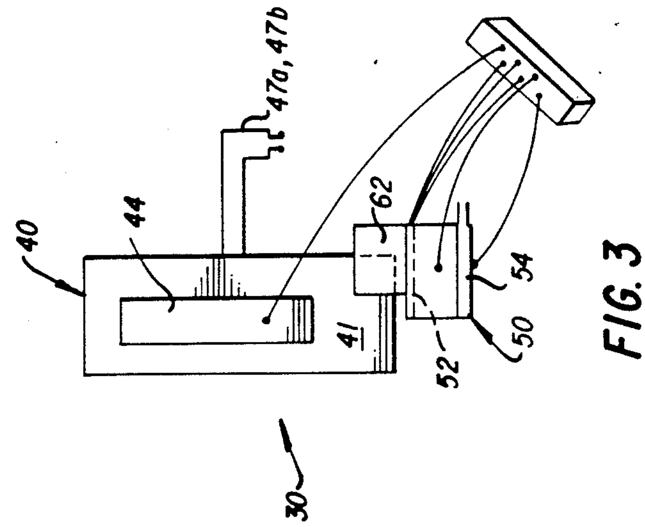
FIGS. 2 and 3 are respectively front and side views of one preferred embodiment of miniature print head assembly constructed in accord with the present invention.
Figure 2:
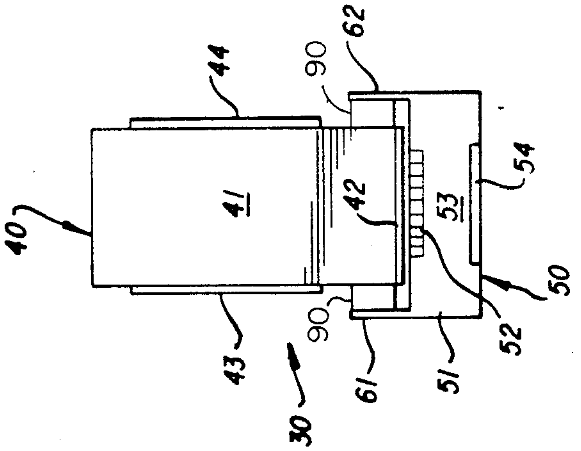

FIGS. 2 and 3 are front and side views of one preferred print head assembly 30 in accord with the present invention. The assembly 30 is formed as an integral device capable of being inserted into a printer or coupled via umbilical fluid and electrical lines to operate remotely and comprises two units joined in a simple and rigid manner to assure proper alignment between operative elements of the two units. The drop ejection unit, designated generally 40, comprises a stimulator body 41, an orifice plate 42 and piezoelectric actuator strips 43, 44 extending along opposite sides of the body 41. The drop control unit, designated generally 50 comprises a catcher component 51 and a charge plate component 52, mounted on the top surface of the catcher component.

Figure 4:
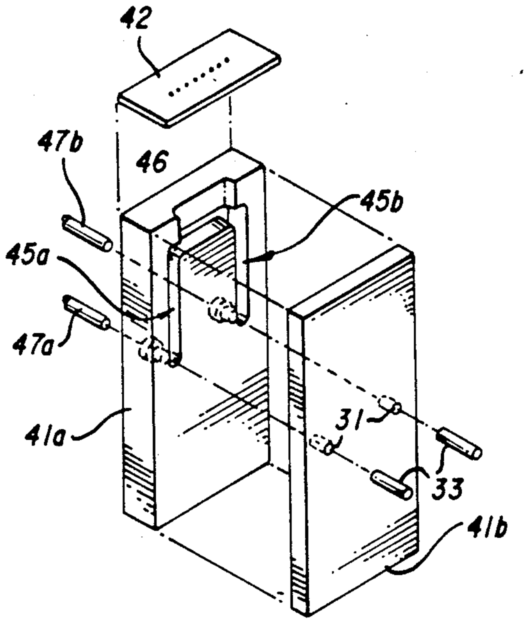
FIGS. 4 and 5 are respectively exploded and assembled perspective views of the drop ejection unit of the FIGS. 2 and 3 embodiment.
Figure 5:
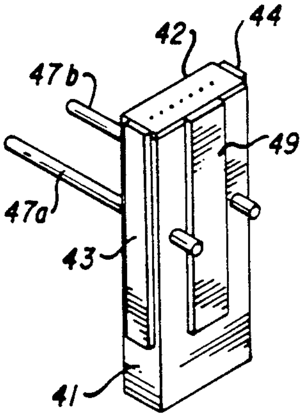

Referring to FIGS. 4 and 5, a preferred drop ejection unit 40 is shown in more detail. The stimulator body 41 is constructed in accord with the teachings of U.S. Pat. No. 4,646,104 of high acoustic Q material such as metal, glass or ceramic. It has a length which is substantially greater than its other, cross-section, dimensions and is designed to make its fundamental dilatational mode resonant frequency approximately equal to the nominal jet droplet stimulation frequency. The disclosure of the '104 patent is incorporated herein with respect to its teachings for such stimulator body and actuator constructions. As shown in FIG. 4, it is preferred that body 41 be formed in two halves 41*a*, 41*b* and that ink inlet and outlet passages 45*a*, 45*b* and ink manifold 46 be machined into one interior face as described in U.S. Pat. No. 4,683,477. Inlet and outlet tubes 47*a*, 47*b* are coupled into openings and can support the block as described in U.S. Pat. No. 4,683,477, which is incorporated herein for its teachings of preferred passage and support constructions. If desired studs such as 33 can fit in recesses 31 of the body 41. The orifice plate 42 is attached over the manifold region 46 as shown in FIG. 5, which also shows the mounted piezoelectric actuator strip 43, 44 constructed and located in accord with the teachings of above-noted U.S. Pat. No. 4,646,104. The strips 43, 44 contract and expand longitudinally in unison to impart planar vibrational shifts to the orifice plate 42 during operation. A feedback piezoelectric strip 49 can be provided to facilitate synchronization of the printing data system with stimulation.

Figure 7:
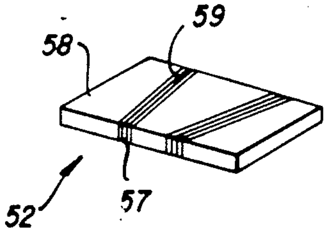
FIG. 7 is a perspective view of the charge plate portion of the FIG. 6 drop control unit.
Figure 6:
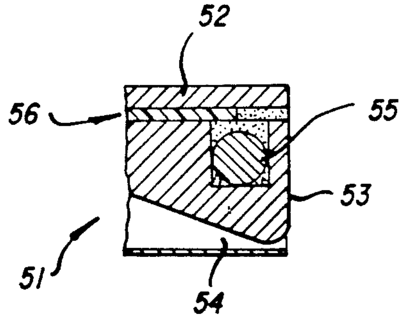
FIG. 6 is a cross-sectional view of the drop control unit of the FIGS. 2 and 3 embodiment.

FIG. 6 shows a cross-section of one preferred embodiment for drop control unit 50, which can be generally in accord with the teachings of U.S. Pat. No. 4,622,562, incorporated herein by reference. As shown, the unit 50 comprises a catcher body portion having an impact surface 53, and a discharge passage 54. A heater element 55 can be mounted in the catcher body or can be omitted, e.g. using heater elements on charge plate 52 instead. Charge plate 52 can be constructed as described in U.S. Pat. No. 4,560,991, incorporated herein by reference, and, as shown better in FIG. 7, can include a plurality of drop charge electrodes, with respective leads 59, all embedded in a dielectric matrix. The charge plate is coupled by a dielectric strip and adhesive 56 to the top surface of catcher 51.

Referring back to FIGS. 2 and 3, it can be seen that in accord with the present invention, the catcher body has two side flanges 61, 62 which extend upwardly from the edges of its top surface. In accord with one preferred construction of the present invention, the drop ejection and charge control units 40 and 50 are joined together by applying a dimensionally stable adhesive substance 90 between those flanges and the lower side walls of the stimulator block 41. Other means of joining the units will occur to those skilled in the art; however, it is highly preferred in accord with the present invention that the attachment of the charge control unit be to the vertical side walls of the resonator. Since the dilatational mode of resonance is used, such coupling will result in a shear loading of the resonator, rather than compressive loading of the resonator as would be the case if attachment to the end of the resonator were used.

Also, it is preferred in accord with the present invention to construct the lower drop control portion with a low mass, e.g. by forming the catcher body of a plastic material.

The invention has been described in detail with particular reference to certain preferred embodiments thereof, but it will be understood that variations and modifications can be effected within the spirit and scope of the invention.

We claim:

1. A miniature continuous ink jet print head assembly comprising:

(a) a drop ejection unit including a stimulator body having a manifold recess in one end and inlet and outlet passages communicating therewith and an orifice plate affixed thereover, said stimulator body having longitudinal side walls normal to said orifice plate and a pair of elongated piezoelectric actuator strips respectively on an opposing pair of said side walls;

(b) a drop control unit including (i) a catcher body having a top surface, a lower discharge passage and an impact surface therebetween and (ii) a charge plate having a plurality of charge electrodes and respective leads mounted, on said top surface of said catcher body; and (c) dimensionally stable adhesive means coupling said drop control unit to said stimulator body side walls, with said charge electrodes in predetermined spacial alignment with said orifices.

2. An improved continuous ink jet print head assembly comprising:

(a) a stimulator and manifold unit having a generally rectangular cross-section, a predetermined length greater than its cross-sectional dimensions, a mechanical resonant frequency generally equal to the desired drop frequency and a pair of elongated piezoelectric strips mounted on opposing side walls;

(b) an orifice plate attached to said member over said manifold recess and comprising a plurality of ink ejection orifices;

(c) a drop charging and catching unit having a cross-sectional size generally the same as that of said stimulator and manifold unit and comprising a charge plate having a plurality of charge electrodes and respective lead portions affixed to the top of a catcher body portion; and (d) dimensionally stable means coupling said drop charging and catching unit to the side walls of said stimulator and manifold unit with said charge electrodes in predetermined spacial alignment with said orifices.

* * * * *